United States Patent
Wu et al.

(10) Patent No.: US 8,007,265 B2
(45) Date of Patent: Aug. 30, 2011

(54) POSITIONING MECHANISM FOR USE IN MOLD STRUCTURE

(75) Inventors: Juan-Rong Wu, Shenzhen (CN); Po-Feng Ho, Taipei Hsien (TW); Zhi-Zhong Xiao, Shenzhen (CN); Guan-Qun Zeng, Shenzhen (CN); Bo Zhang, Shenzhen (CN); Kao-Hua Guan, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 386 days.

(21) Appl. No.: 12/164,257

(22) Filed: Jun. 30, 2008

(65) Prior Publication Data

US 2009/0230282 A1 Sep. 17, 2009

(30) Foreign Application Priority Data

Mar. 12, 2008 (CN) .......................... 2008 1 0300544

(51) Int. Cl.
*B29C 45/14* (2006.01)
*B29C 70/78* (2006.01)
(52) U.S. Cl. ........................................ 425/112; 425/125
(58) Field of Classification Search ................... 425/112, 425/125
See application file for complete search history.

(56) References Cited

U.S. PATENT DOCUMENTS

| | | | | |
|---|---|---|---|---|
| 3,971,841 A | * | 7/1976 | Rubinstein | 264/275 |
| 4,865,794 A | * | 9/1989 | Nakajima et al. | 264/278 |
| 5,779,958 A | * | 7/1998 | Nishihara et al. | 264/161 |
| 5,783,134 A | * | 7/1998 | Yabe et al. | 264/272.14 |
| 6,554,598 B1 | * | 4/2003 | Tsuruta | 264/272.14 |

FOREIGN PATENT DOCUMENTS

| | | | |
|---|---|---|---|
| CN | 101028730 A | | 9/2007 |
| JP | 09323326 A | * | 12/1997 |
| JP | 2004249653 A | * | 9/2004 |

OTHER PUBLICATIONS

Partial machine translation of JP 09-323326 A dated Dec. 1997 obtained from the JPO website.*

* cited by examiner

*Primary Examiner* — Robert B Davis
(74) *Attorney, Agent, or Firm* — Altis Law Group, Inc.

(57) ABSTRACT

A positioning mechanism (24) for use in a mold structure (100) to position a film (30) within the mold structure is provided. The mold structure includes a core mold portion (10) and a cavity mold portion (20) mating with the core mold portion. The core mold portion includes a core plate (12) and a core insert (14) formed on the plate. The cavity mold portion includes a positioning mechanism having a moveable cavity insert (242) and an elastic member (244) for outwardly biasing the cavity insert.

16 Claims, 2 Drawing Sheets

POSITIONING MECHANISM FOR USE IN MOLD STRUCTURE

BACKGROUND OF THE INVENTION

1. Field of the Invention

The exemplary invention relates to positioning mechanisms, particularly to positioning mechanisms used in mold structures.

2. Description of Related Art

Insert molding labeling (IML) technology is normally implemented to integrally form a shell with a provided film. The shell is insert molded with the provided film and used in a portable electronic device.

However, during molding process, precise positioning of the film within a mold structure can be difficult.

Therefore, there is a room for improvement within the art.

BRIEF DESCRIPTION OF THE DRAWINGS

Many aspects of the exemplary positioning mechanism of a mold structure can be better understood with reference to the following drawings. These drawings are not necessarily drawn to scale, the emphasis instead being placed upon clearly illustrating the principles of the exemplary positioning mechanism of the mold structure. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

During an insert molding labeling (IML) process, an exemplary positioning mechanism is suitably used to position a film within the mold structure. Therefore, the film can be integrally formed with a shell. The shell can be used with electronic devices, such as mobile phones, personal digital handsets, and so on.

Figure 1:
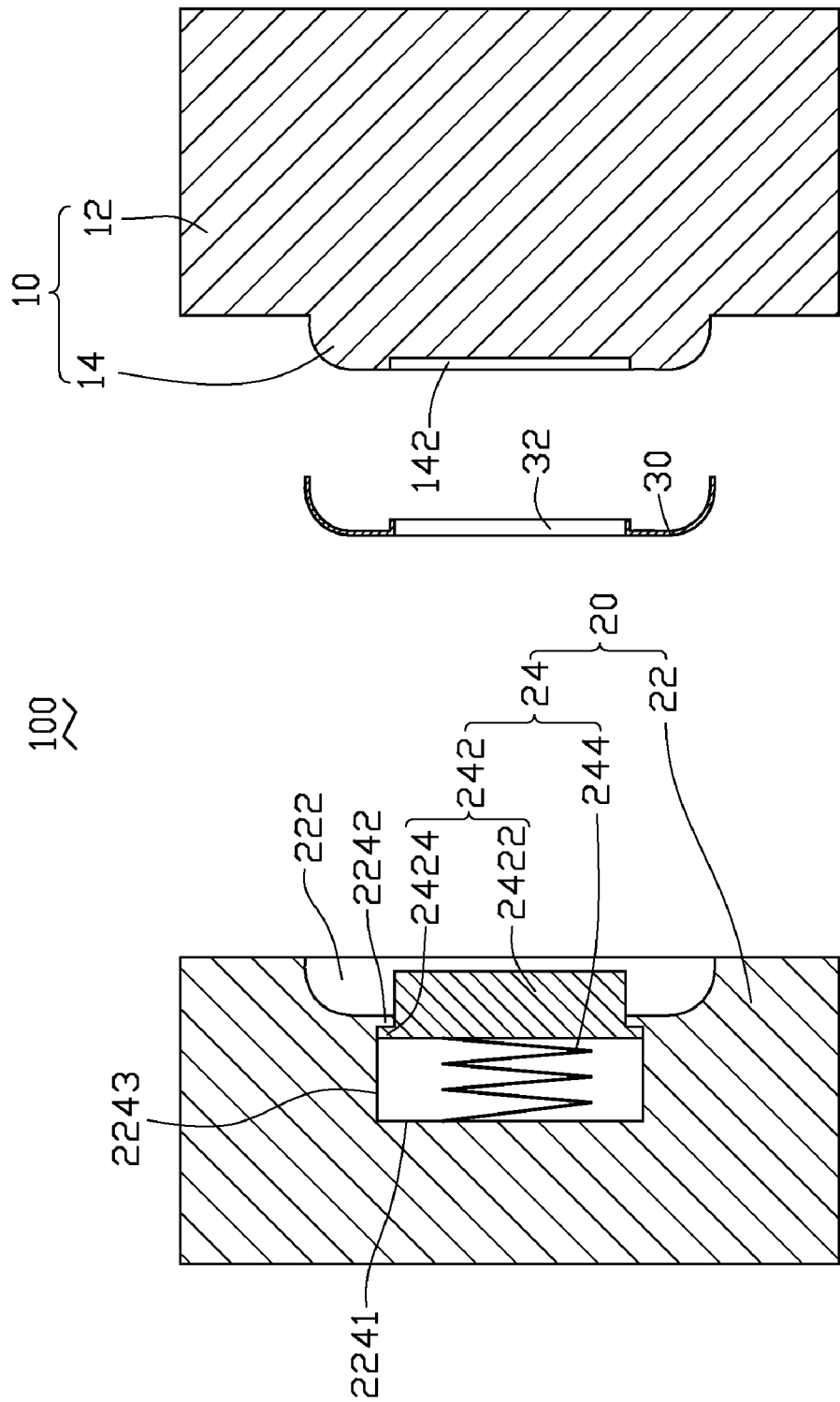
FIG. 1 is a cross sectional view of a mold structure using a positioning mechanism therewith according to an exemplary embodiment.

Referring to FIG. 1, the mold structure 100 includes a core mold portion 10 and a cavity mold portion 20 mating with the core mold portion 10.

The core mold portion 10 includes a rectangular core plate 12 and a core insert 14. The core insert 14 protrudes from a first mold assembly surface of the core plate 12. The core insert 14 includes a recess 142 facing the cavity mold portion 20.

The cavity mold portion 20 includes a cavity plate 22 and a positioning mechanism 24. The cavity plate 22 has a second mold assembly surface (not labeled) defined to correspond with the first mold assembly surface of the core plate 12. The second mold assembly surface defines a positioning cavity 222. When the positioning cavity 222 receives the core insert 14, a molding cavity (not labeled but shown in FIG. 2) is formed for molding the shell.

Figure 2:
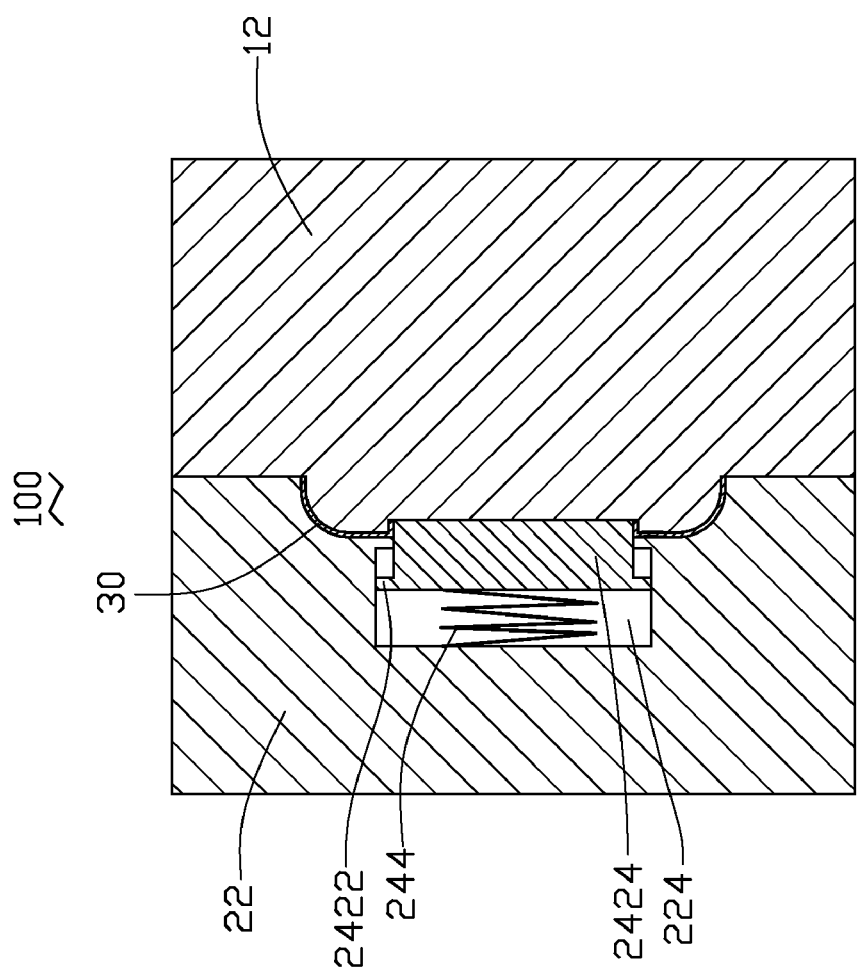
FIG. 2 is an assembled view of the mold structure shown in FIG. 1.

Referring also to FIG. 2, the cavity plate 22 further defines a sliding cavity 224positioning cavity 222. The sliding cavity 224 accommodates the positioning mechanism 24 and allows the cavity insert 242 to slide within the sliding cavity 224. The sliding cavity 224 is enclosed by a bottom wall 2241 and a peripheral wall 2243. A limiting flange 2242 is formed on the peripheral wall 2243 and is further located at the interface of the positioning cavity 222 and the sliding cavity 224. The limiting flange 2242 keeps the cavity insert 242 from sliding out of the sliding cavity 224.

The positioning mechanism 24 is configured for positioning the film 30 within the mold structure 100. The positioning mechanism 24 includes the cavity insert 242 and an elastic member 244. The elastic member 244 can be exemplified as a coil spring.

The cavity insert 242 is generally step-shaped and has a positioning portion 2422 and a sliding portion 2424 integrally connecting with the positioning portion 2422 and accommodated in the sliding cavity 224. The cavity insert 242 is assembled within the sliding cavity 224 and the positioning portion 2422 protrudes from the sliding cavity 224 and enters into the positioning cavity 222. As such, the limiting flange 2242 prevents the sliding portion 2424 from sliding out of the sliding cavity 224.

The positioning portion 2422 has substantially the same size and shape as a positioning hole 32 defined through the film 30. Thus, the film 30 can be positioned with the cavity insert 242 by passing the positioning portion 2422 through the positioning hole 32. The outer surface of positioning portion 2422, after passing through the positioning hole 32, resists against the bottom wall of the recess 142 of the core insert 14.

The elastic member 244 is accommodated within the sliding cavity 224 and has one end acting on the bottom wall 2241 of the sliding cavity 224 and the other end acting on the positioning portion 2422. The elastic member 244 is compressed when assembled between the bottom wall 224 and the positioning portion 2422, thereby biasing the cavity insert 242 out of the sliding cavity 224.

Referring to FIGS. 1 and 2, when in use, the film 30 is first coiled into and then positioned with the positioning portion 2422. The core mold portion 10 is brought together with the cavity mold portion 20. During this assembly stage, the core insert 14 engages into the positioning cavity 222 and urges the cavity insert 242 to slide into the sliding cavity 224 and compress the elastic member 244. Thus, the film 30 is firmly secured in the molding cavity (not labeled) formed between the core mold portion 10 and the cavity mold portion 20.

Finally, conventional Insert molding labeling (IML) technology can be implemented to integrally form a shell with the film 30.

The film 30 can be conveniently and precisely positioned by the cavity insert 242 within the mold structure 100 by any number of conventional manual or automatic operations.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A positioning mechanism for use in a mold structure to position a film within the mold structure for an injection molding, the mold structure including a core mold portion and a cavity mold portion for mating with the core mold portion, the core mold portion including a core plate and a core insert formed on the core plate, the cavity mold portion including a cavity plate and a positioning cavity defined in the cavity plate, the positioning cavity corresponding to the core insert, the positioning mechanism comprising:

a cavity insert comprising a positioning portion and a sliding portion;

the sliding portion integrally connecting with the positioning portion, the sliding portion configured for a limited sliding within a sliding cavity defined in the cavity plate and communicating with the cavity;

the positioning portion positioning the film in the positioning cavity during the injection molding, without any deformations to the film by the positioning; and an elastic member positioned between the cavity plate and the cavity insert for biasing the positioning portion out of the sliding cavity to enter into the positioning cavity.

2. The positioning mechanism as claimed in claim 1, wherein the film defines a positioning hole therethrough, the positioning portion passing through the positioning hole to position and hold the film during the injection molding.

3. The positioning mechanism as claimed in claim 2, wherein the sliding cavity is enclosed by a bottom wall and a peripheral wall, a limiting flange is formed on the peripheral wall, the sliding portion limited by the limiting flange.

4. The positioning mechanism as claimed in claim 2, wherein the positioning portion resists against the core insert, and the core insert resists against the film, securing the film in the positioning cavity.

5. The positioning mechanism as claimed in claim 4, wherein the core insert defines a recess therein, the positioning portion resisting against the recess.

6. The positioning mechanism as claimed in claim 1, wherein the elastic member is positioned within the sliding cavity and acts on a bottom wall enclosing the sliding cavity and the sliding portion.

7. The positioning mechanism as claimed in claim 6, wherein the elastic member is a coil spring.

8. The positioning mechanism as claimed in claim 7, wherein the elastic member is compressed between the bottom wall and the sliding portion.

9. A mold structure for insert molding a substrate with a film, comprising:

a core mold portion comprising a core plate and a core insert formed on the plate; and a cavity mold portion assembled with the core mold portion, the cavity mold portion comprising a cavity plate, a positioning cavity and a sliding cavity defined in the cavity plate, and a positioning mechanism attached to the cavity plate, the sliding cavity communicating with the positioning cavity, the positioning cavity corresponding to the core insert, the positioning mechanism configured for positioning a film for an injection molding between the core mold portion and the cavity mold portion, the positioning mechanism comprising:

a cavity insert comprising a positioning portion and a sliding portion, the sliding portion configured for sliding within the sliding cavity, the positioning portion positioning the film in the positioning cavity during the molding process, without any deformations to the film by the positioning; and an elastic member positioned between the cavity plate and the sliding portion;

wherein the positioning portion of the cavity insert is biased out of the sliding cavity to enter into the positioning cavity.

10. The mold structure as claimed in claim 9, wherein the film defines a positioning hole therethrough, the positioning portion passing through the positioning hole to position and hold the film during the injection molding.

11. The mold structure as claimed in claim 10, wherein the sliding cavity is enclosed by a bottom wall and a peripheral wall, a limiting flange is formed on the peripheral wall, the sliding portion limited by the limiting flange.

12. The mold structure as claimed in claim 9, wherein the positioning portion resists against the core insert, and the core insert resists against the film, securing the film in the positioning cavity.

13. The mold structure as claimed in claim 12, wherein the core insert defines a recess therein, the positioning portion resisting against the recess.

14. The mold structure as claimed in claim 9, wherein the elastic member is positioned within the sliding cavity and acts on a bottom wall enclosing the sliding cavity and the sliding portion.

15. The mold structure as claimed in claim 14, wherein the elastic member is a coil spring.

16. The mold structure as claimed in claim 15, wherein the elastic member is compressed between the bottom wall and the sliding portion.

* * * * *